United States Patent [19]

Kimura

[11] Patent Number: 5,151,892
[45] Date of Patent: Sep. 29, 1992

[54] OPTICAL HEAD DEVICE FOR OPTIMALLY DETECTING A FOCUSSING ERROR

[75] Inventor: Yasuo Kimura, Tokyo, Japan
[73] Assignee: NEC Corporation, Tokyo, Japan
[21] Appl. No.: 453,894
[22] Filed: Dec. 20, 1989

[30] Foreign Application Priority Data

Dec. 20, 1988 [JP] Japan .................. 63-322496
Dec. 20, 1988 [JP] Japan .................. 63-322497
Dec. 20, 1988 [JP] Japan .................. 63-322498

[51] Int. Cl.$^5$ .............................................. G11B 7/00
[52] U.S. Cl. ................................................... 369/109
[58] Field of Search .............. 369/44.11, 44.12, 44.14, 369/44.41, 44.42, 109, 112; 250/201.5

[56] References Cited

U.S. PATENT DOCUMENTS

| | | | |
|---|---|---|---|
| 4,504,938 | 3/1985 | Tajima | 369/44.41 |
| 4,733,065 | 3/1988 | Hoshi et al. | 369/112 |
| 4,750,162 | 6/1988 | Tajima | 369/44.41 |
| 4,862,446 | 8/1989 | Maeda | 369/112 |
| 4,885,734 | 12/1989 | Yuzo | 369/109 |
| 4,918,679 | 4/1990 | Opheij et al. | 369/44.37 |
| 4,945,529 | 7/1990 | Ono et al. | 369/44.12 |
| 4,983,017 | 1/1991 | Tsuji et al. | 369/109 |
| 4,993,011 | 2/1991 | Torazawa et al. | 369/112 |
| 5,001,334 | 3/1991 | Ikeda | 369/44.41 |

Primary Examiner—Donald McElheny, Jr.
Attorney, Agent, or Firm—Sughrue, Mion, Zinn Macpeak & Seas

[57] ABSTRACT

In an optical head device, a grating element (22) is partitioned into first and second regions (221, 222) by a partition line (23) which passes through its point of intersection with an optical axis of an optical beam generated from a source point (17) and through a particular point. According to this invention, the particular point is determined so as to obtain an optimal focussing error signal within a dynamic range. An optical detector (24) is segmented into three segments by first and second segmentation lines (251, 252) which should preferably form particular angles with a reference plane (35) defined by the source point, the point of intersection, and a middle point between first and second points of convergence of beams diffracted from the first and the second regions. Alternatively, the detector is segmented into first and second sets of segments by a segmentation line on which the first and the second points of convergence are present and which should preferably form a particular angle with the reference plane. According to this invention, such a particular angle is determined so as to obtain the optimal focussing error signal even when the optical beam has a wavelength which is different from its nominal wavelength.

12 Claims, 12 Drawing Sheets

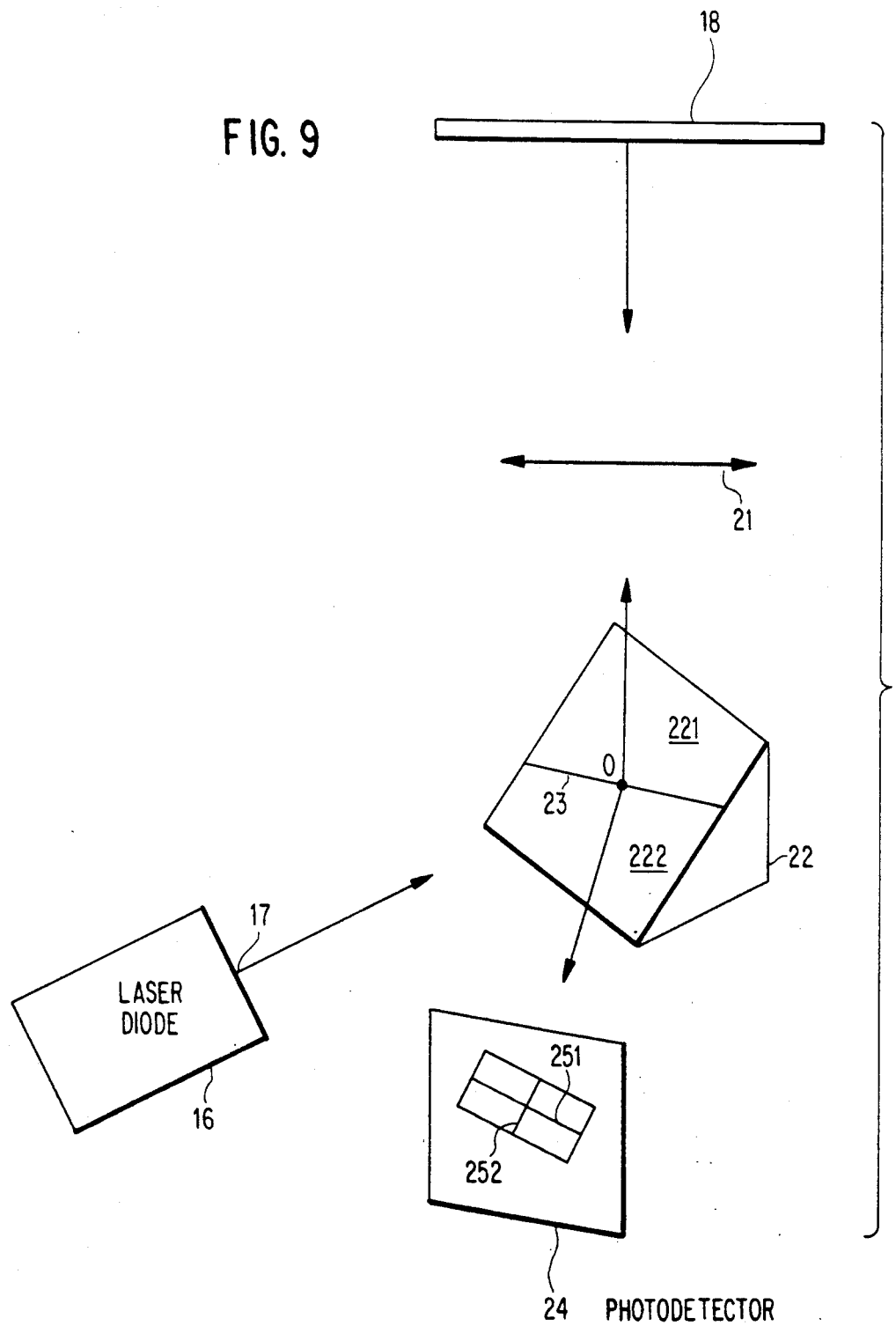

OPTICAL HEAD DEVICE FOR OPTIMALLY DETECTING A FOCUSSING ERROR

BACKGROUND OF THE INVENTION

This invention relates to an optical head device used in reproducing a signal recorded on a compact disk, a video disk, or a like disk and in recording, reproduc an information signal as regards an optical disk, a magneto-optical disk, or the like. The compact disk, the video disk, the optical disk, the magneto-optical disk, or a like disk will herein be called an optical recording medium in general.

In the manner known in the art, the optical head device is for use in combination with an optical source for generating an optical beam along an optical axis from a source point. Being used for the optical head device, the optical beam is a coherent beam. Usually, a laser diode is used as the optical source. It is to be noted that the optical beam has an actual wavelength which may vary from a nominal wavelength with the temperature.

The optical head device comprises a focussing or imaging lens system for focussing the optical beam substantially on an optical recording medium. Back towards the lens system, the recording medium reflects the optical beam as a returning beam to make the lens system produce the returning beam as a reflected beam. It should be noted that the recording medium may not necessarily be correctly positioned relative to the lens system to give rise to a focussing error. When the recording medium is correctly positioned, the focussing error is equal to zero.

An optical grating element is alternatively referred to as an optical holographic element and is partitioned into a plurality of grating regions. It is therefore possible to understand that the grating element comprises first and second regions partitioned by a partition line, which intersects the optical axis. The first and second regions are for diffracting the reflected beam into first and second diffracted beams.

An optical detector or photodetector is segmented into a plurality of detector segments. The optical detector therefore comprises first through third segments and may or may not further comprise a fourth segment. For example, the optical detector is segmented by first and second substantially parallel segmentation lines into three segments. Alternatively, the optical detector is segmented by first and second orthogonal segmentation lines into four segments. Such an optical detector receives the first and the second diffracted beams at first and second points of convergence to produce an electric output signal.

When the optical detector consists of three segments, the first and the second points of convergence are on the first and the second segmentation lines. When the optical detector consists of four segments, the first and the second points of convergence are on one of the first and the second segmentation lines on both sides of the other segmentation line. In any event, each of the first and the second points of convergence is on one of the segmentation lines that is between two of the detector segments.

When the optical head device is used in reproducing a signal recorded on the recording medium, the output signal is used as a read-out signal. When the optical head device is used in any one of three usages described above, the output signal is used as a focussing error signal in detecting the focussing error and as a tracking error signal in detecting a tracking error which arises when the lens system does not correctly or desiredly focus the optical beam along a recording track preliminarily defined on the recording medium.

In the manner which will later be described in connection with a conventional optical head device, each of the first and the second points of convergence moves in a direction forming a certain angle with the segmentation line when the optical beam is defocussed on the recording medium. A like displacement occurs when the wavelength varies. Moreover, each point of convergence deforms asymmetrically on both sides of the segmentation line when the optical beam is defocussed. Under the circumstances, the output signal is adversely affected. More particularly, it results that each of the read-out signal and the focussing error signal has a reduced intensity and that the focussing error signal is subjected to offset. The tracking error signal is similarly degraded.

SUMMARY OF THE INVENTION

It is therefore a general object of the present invention to provide an optical head device capable of producing an excellent electric output signal.

It is another general object of this invention to provide an optical head device which is used in combination with an optical source for generating an optical beam and comprises a focussing lens system for focussing the optical beam on an optical recording medium and which can produce a focussing error signal exempted from adverse effects caused thereon when the lens system does not correctly focus the optical beam on the recording medium.

It is a specific object of this invention to provide an optical head device of the type described, capable of producing the excellent electric output signal even when the optical source generates the optical beam with an actual wavelength which may or may not be different from a nominal wavelength.

It is another specific object of this invention to provide an optical head device of the type described, which can produce the focussing error signal exempted from the adverse effects even when the optical source generates the optical beam with the actual wavelength.

Other objects of this invention will become clear as the description proceeds.

On describing the gist of this invention, it is possible to undestand that an optical head device is for use in combination with an optical source for generating an optical beam along an optical axis from a source point and comprises a lens system having a magnification M for focussing the optical beam substantially on an optical recording medium which reflects the optical beam to make the lens system produce a reflected beam, an optical grating element comprising first and second regions partitioned by a partition line intersecting the optical axis for diffracting the reflected beam into first and second diffracted beams, and an optical detector comprising first thorugh third segments for receiving the first and the second diffracted beams at first and second points of convergence to produce an electric output signal, each of the first and the second points of convergence being on a segmentation line between two of the segments.

In connection with the above-understood optical head device, attention is directed to an orthogonal XYZ coordinate system having its origin at a point of intersection of the optical axis with the partition line, an XY plane along the grating element, and a Z axis which passes through the origin. The source point has a distance G from the origin and coordinates (x(g), 0, z(g)). A middle point between the first and the second points of convergence has coordinates (x(f), y(f), z(f)). A particular point is taken into consideration to have coordinates (x(h), y(h), 0) and distances D(g) and D(f) from the source point and the middle point. It will be assumed that the output signal is used in detecting a focussing error of the optical head device with a dynamic range between plus and minus d.

According to this invention, the above-understood optical head device is characterized in that the partition line passes through the origin and the particular point with the coordinates x(h) and y(h) made to substantially satisfy a relation:

$$x(p)-x(f):y(p)-y(f):z(p)-z(f)=\alpha:\beta:\gamma,$$

where x(p), y(p), and z(p) represents coordinates of a point on the optical detector, where $\alpha$, $\beta$, and $\gamma$ are proportional to direction cosines of a line of intersection of the optical detector with a reference plane defined by the origin and the source and the middle points, and where the coordinates x(h), y(h), x(p), y(p), and z(p) are related to one another according to a set of eleven equations:

$$m=2M^2d,$$

$$Lin=[(G+m)x(g)-Gx(h)]/B,$$

$$Min=-Gy(h)/B,$$

$$B=[G^2(G+m)^2-2G(G+m)x(g)x(h)+G^2(x^2(h)+y^2(h))]^{\frac{1}{2}},$$

$$Lout=Lin-[(x(g)-x(h))/D(g)-(x(f)-x(h))/D(f)],$$

$$Mout=Min-[-y(h)/D(g)-(y(f)-y(h))/D(f)],$$

$$Nout=[1-L^2out-M^2out]^{\frac{1}{2}},$$

$$t(p)=[-x(h)y(f)z(g)+y(h)(x(f)z(g)-x(g)z(f))]/[y(f)z(g)Lout+(x(f)z(g)-x(g)z(f))Mout-x(g)y(f)Nout],$$

$$x(p)=t(p)Lout+x(h),$$

$$y(p)=t(p)Mout+y(h),$$

and $$z(p)=t(p)Nout.$$

BRIEF DESCRIPTION OF THE DRAWING

FIG. 9 is a schematic perspective view of an optical head device according to a second embodiment of this invention, an optical source, and an optical recording medium;

DESCRIPTION OF THE PREFERRED EMBODIMENTS

Figure 1:
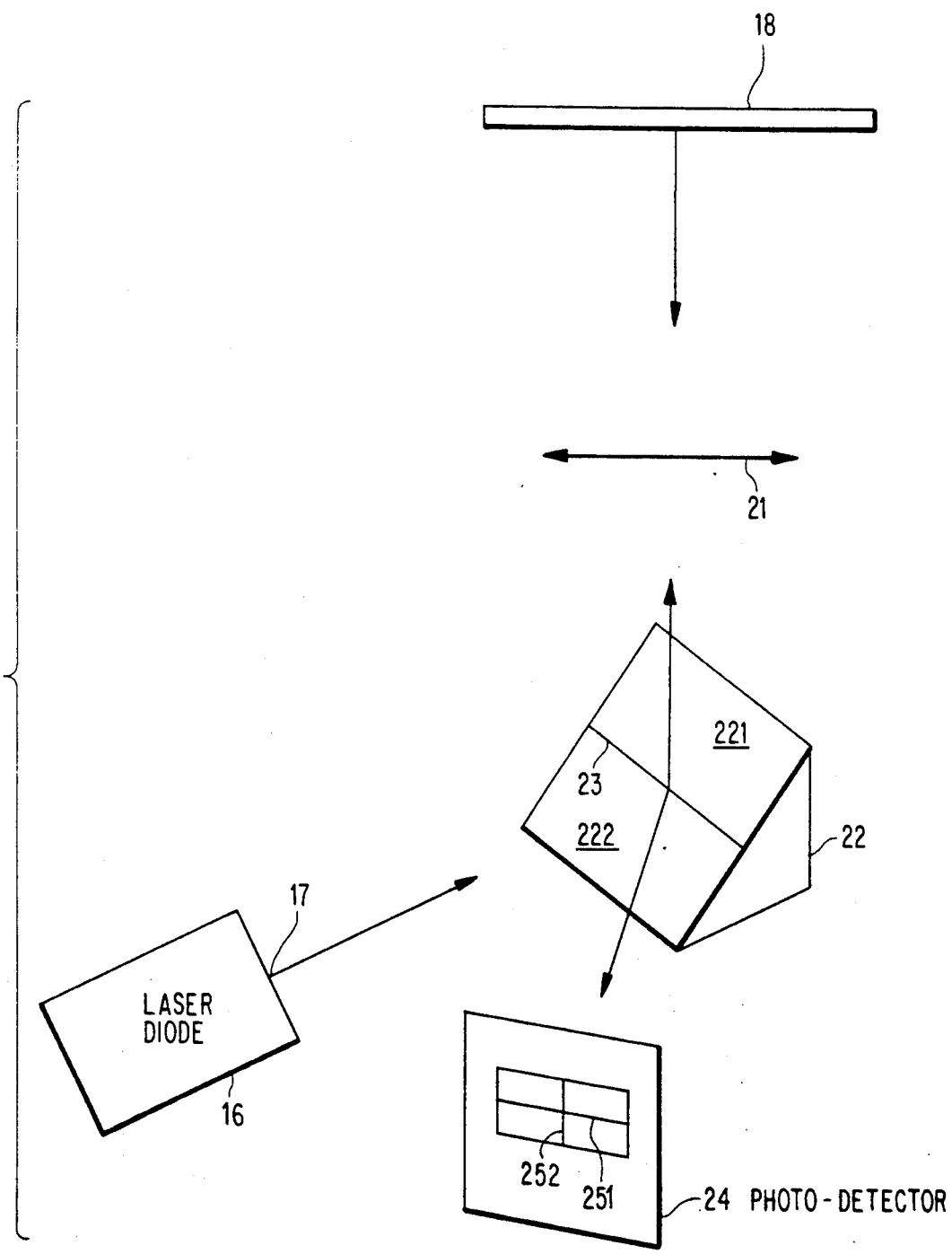
FIG. 1 schematically shows a perspective view of a conventional optical head device together with an optical source and an optical recording medium.

Referring to FIG. 1, a conventional optical head device will be described at first in order to facilitate an understanding of the present invention. In FIG. 1, the optical head device is of the type which is described in U.S. patent application Ser. No. 940,007 filed Dec. 10, 1986, now U.S. Pat. No. 4,945,529, for assignment to the instant assignee by Yuzo Ono et al including Yasuo Kimura, the present applicant, based on eleven Japanese Patent Applications No. 278,365 of 1985 and others.

The optical head device is for use in combination with an optical source and an optical recording medium. The optical source, depicted at 16, is for generating an optical beam along an optical axis from a source point 17. Being used for the optical head device, the optical beam is a coherent beam. It is usual to use a laser diode as the optical source 16. The optical head device may or may not comprise the optical source 16 as an element thereof. In any event, the source point 17 and the optical axis are predetermined in relation to other elements of the optical head device. The recording medium is schematically depicted at 18 and may be a compact disk, a video disk, an optical disk, a magneto-optical disk, or a like recording medium. It may be mentioned here that the optical beam has a wavelength which inevitably varies with the temperature. The wavelength is herein called an actual wavelength and may or may not be different from a nominal wavelength $\lambda(0)$ of the optical beam.

In the optical head device, a focussing or imaging lens system 21 is used to focus the optical beam substantially on the optical recording medium 18. Back towards the lens system 21, the recording medium 18 reflects the optical beam as a returning beam to make the lens system 21 produce the returning beam as a reflected beam. It should be noted here that the recording medium 18 may not be necessarily correctly or desiredly positioned relative to the lens system 21 or the optical head device so as to give rise to a focussing error. If the recording medium 18 is correctly positioned, the focussing error is equal to zero.

An optical grating element 22 is interposed between the optical source 16 or the source point 17 and the lens system 21 in an optical path of the optical beam. The grating element is often referred to as an optical holographic element. This is because the grating element 22 is typically a hologram manufactured in the manner which will later become clear.

In the example being illustrated, the optical grating element 22 is a reflecting optical grating element and subjects the optical beam of the optical source 16 to regular reflection towards the lens system 21. The grating element 22 comprises first and second regions 221 and 222 which are partitioned by a partition line 23 intersecting the optical axis. It should be understood that the grating element 22 is depicted to have a shape of a rectangular prism merely for convenience of illustration. The first and the second regions 221 and 222 are for diffracting the reflected beam into first and second diffracted beams which are preferably first-order diffracted beams and are depicted by a single line merely for simplicity of illustration.

An optical detector or photodetector 24 is placed adjacent to the source point to receive the first and the second diffracted beams. The optical detector 24 is segmented by a plurality of segmentation lines into at least three detector segments.

In the illustrated example, the optical detector 24 is segmented by first and second orthogonal segmentation lines 251 and 252 into the first through fourth segments 26, 27, 28, and 29 which will presently be illustrated. The first and the second diffracted beams are caused by the lens system 21 to converge at first and second points of convergence 31 and 32 (to be later illustrated) which are on one of the first and the second segmentation lines 251 and 252. That one of the segmentation lines 251 and 252 is herein called the first segmentation line 251 without loss of generality. Such a point of convergence is alternatively called an optical spot.

Figure 2:
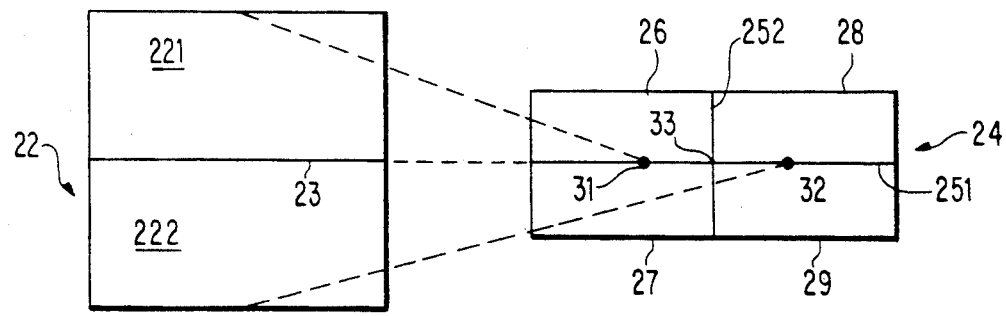
FIG. 2 is a schematic exploded view of an optical grating element and an optical detector which are used in the optical head device depicted in FIG. 1.

Turning to FIG. 2, the optical grating element 22 is looked at from the optical source 16 and the optical detector 24 perpendicularly of the grating element 22. The optical detector 24 is seen from the grating element 22 perpendicularly of a beam receiving surface thereof. It will be understood that the optical detector 24 is depicted in FIG. 1 as seen backwardly relative to the beam receiving surface.

In the manner depicted in FIG. 2, the partition line 23 of the optical grating element 22 and the first segmentation line 251 of the optical detector 24 are on a common plane in the optical head device illustrated with reference to FIG. 1. Merely by way of example, the first through the fourth segments 26 to 29 are arranged as illustrated. The first and the second diffracted beams reach the first through the fourth segments 26 to 29 as four beam portions. Detecting the beam portions, the first through the fourth segments 26 to 29 produce first through fourth signal components V(1), V(2), V(3), and V(4) collectively as an electric output signal.

When the optical head device is used in reproducing an information signal recorded on the optical recording medium 18, a total sum of the first through the fourth signal components is used as a read-out signal representative of the information signal. On using the optical head device either in reproducing or cancelling the information signal or in recording an information signal on the recording medium 18, such an electric output signal is used as a focussing error signal in detecting the focussing error. The focussing error signal is given by a difference between a sum of the first and the fourth signal components V(1) and V(4) and another sum of the secon and the third signal components V(2) and V(3). On using the optical head device is reproduction, cancellation, and/or record of the information signal, the output signal is furthermore used as a tracking error signal in detecting a tracking error which arises when the lens system 21 does not correctly or desiredly focus the optical beam along a recording track preliminarily defined on the recording medium 18.

Figure 3A:
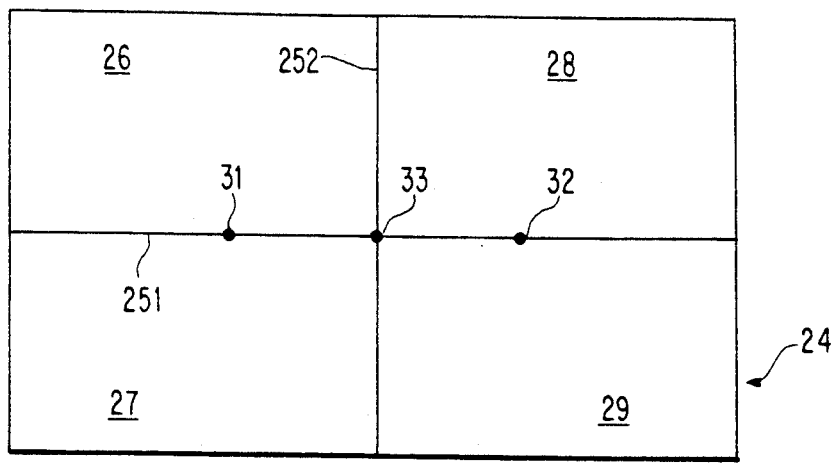
FIGS. 3 A through C are front views of the optical detector illustrated in FIG. 2.
Figure 3B:
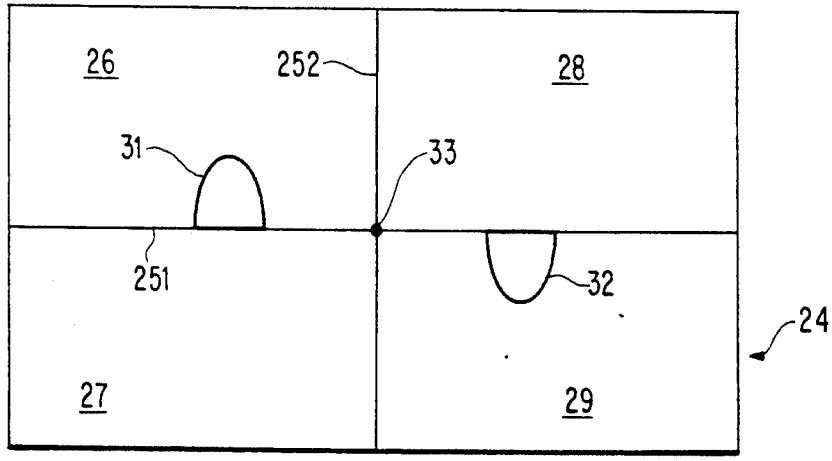
Figure 3C:
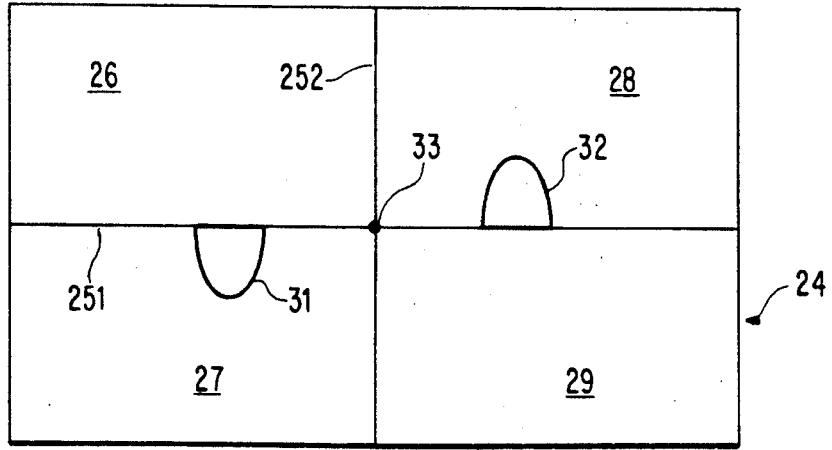

Referring to FIGS. 3A through C, each of the first and the second optical spots 31 and 32 moves and deforms when the optical recording medium 18 is not correctly positioned relative to the lens system 21 so that defocussing or incorrect or inaccurate focussing occurs on the optical recording medium 18. For reference, FIG. 3A shows the first and the second points of convergence 31 and 32 when focussing is correct.

In the manner illustrated in FIG. 3B, the first optical spot 31 is formed in the first segment 26 alone and the second optical spot 32, in the fourth segment 29 alone when the optical recording medium 18 is near to the lens system 21. As depicted in FIG. 3C, the first and the second optical spots 31 and 32 are formed only in the second and the third segments 27 and 28, respectively, when the recording medium 18 is away from the lens system 21. In either event, the optical spot 31 or 32 is deformed to have a wider area.

It may be mentioned in connection with FIGS. 3B and C that the first and the second optical spots 31 and 32 are on the first segmentation line 251. Strictly speaking in connection with FIGS. 3A through C, the first and the second points of convergence 31 and 32 are on the first segmentation line 251 when the optical beam is correctly focussed on the recording medium 18.

For the optical head device illustrated with reference to FIG. 1, it has been the practice to dispose the source point 17 of the optical source 16 on the common plane defined by the partition line 23 of the optical grating element 22 and the first segmentation line 251 on which the first and the second optical spots 31 and 32 are formed when the focussing error is equal to zero. This is in order to suppress adverse effects which would otherwise be caused on the focussing error signal by variations in the wavelength of the optical beam emitted by the optical source 16. It is, however, impossible to completely suppress an adverse effect which is caused on the focussing error signal by defocussing of the optical beam on the optical recording medium 18 unless the optical, the reflected, and the first and the second diffracted beams are coplanar. Incidentally, the first and the second optical spots 31 and 32 are deformed symmetrically on both sides of the first and the second segmentation lines 251 and 252 when the first and the second diffracted beams are coplanar with the optical and the reflected beams.

Figure 4A:
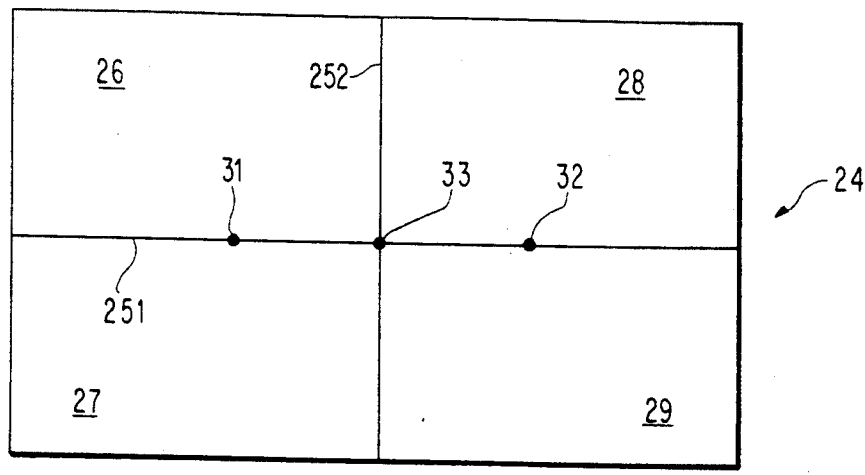
FIGS. 4 A through C are different front views of the optical detector shown in FIG. 2.
Figure 4B:
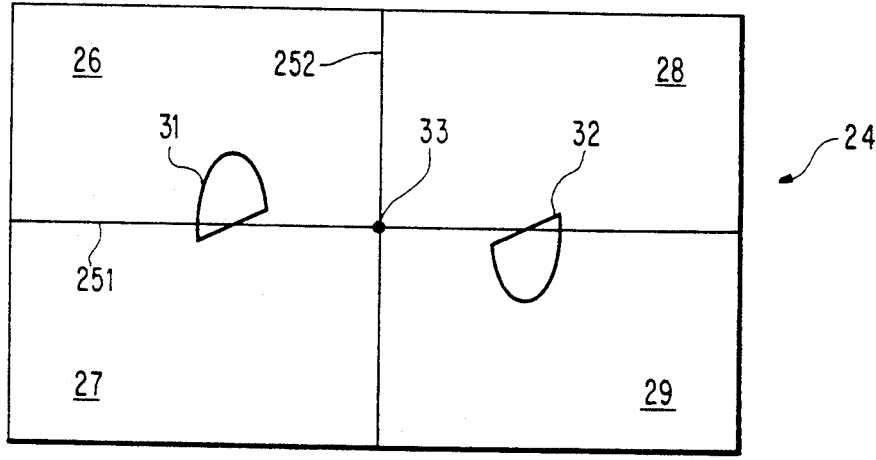
Figure 4C:
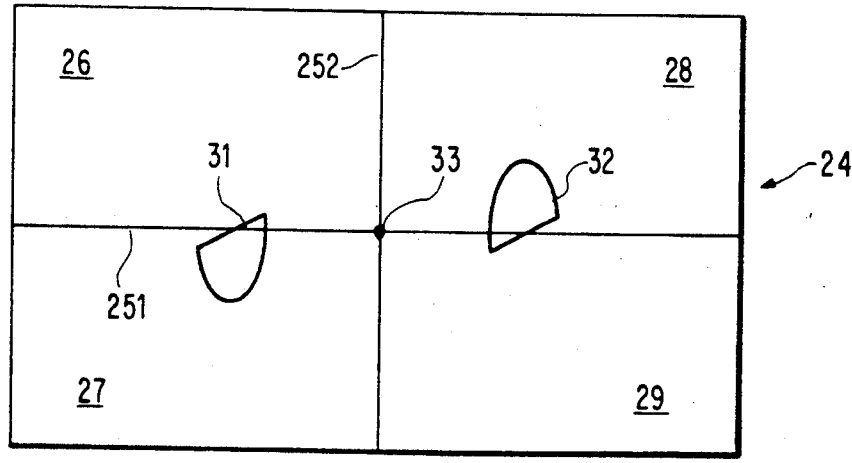

Turning to FIGS. 4A through C, it should be noted that the first and the second diffracted beams are not coplanar with the optical and the reflected beams in practice. In this event, each of the first and the second optical spots 31 and 32 is subjected to a displacement which has a direction forming a certain angle with the first segmentation line 251 of the optical detector 24. Furthermore, the first and the second optical spots 31 and 32 are deformed asymmetrically on both sides of the first and the second segmentation lines 251 and 252. For reference, FIG. 4A shows the first and the second points of convergence 31 and 32 when focussing is correct.

In the manner exemplified in FIG. 4B, the first and the second optical spots 31 and 32 are subjected to first and second displacements forming angles with the first segmentation line 251 when the optical recording medium 18 is near to the lens system 21. As exemplified in FIG. 4C, the first and the second optical spots 31 and 32 are subjected to third and fourth displacements forming other angles with the first segmentation line 251 when the recording medium 18 is away from the lens system 21. In either event, the first and the second optical spots 31 and 32 are subjected to asymmetric deformation relative to the first and the second segmentation lines 251 and 252.

In the manner which will later become clear as the description proceeds, the first and the second points of convergence or optical spots 31 and 32 are likewise subjected to displacements and asymmetric deformations when the actual wavelength of the optical beam of the optical source 16 is different from the nominal wavelength. The displacements and the deformations give rise to a degradation of the focussing error signal.

Figure 5:
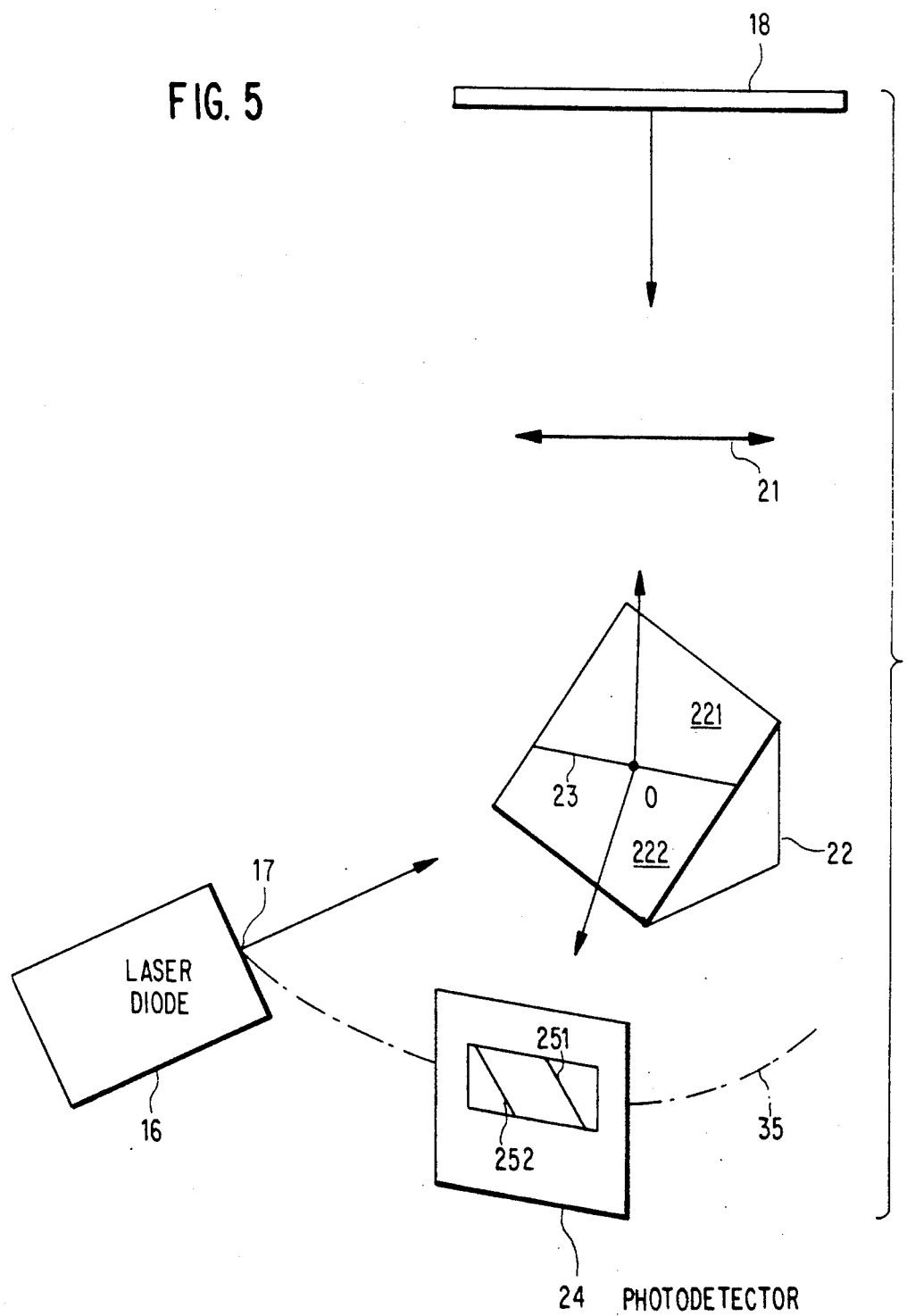
FIG. 5 is a schematic perspective view of an optical head device according to a first embodiment of the instant invention, an optical source, and an optical recording medium.

Referring to FIG. 5, attention will be now directed to an optical head device according to a first embodiment of this invention. The optical head device comprises similar parts designated by like reference numerals. The optical source 16, the source point 17, the optical recording medium 18, and the lens system 21 are not different from those illustrated in connection with FIG. 1.

Like the optical grating element 22 described in conjunction with FIG. 1, the grating element 22 comprises first and second regions which are designated by the reference numerals 221 and 222. The partition line 23 of the grating element 22 intersects the optical axis of the optical beam generated by the optical source 16 at a point of intersection.

It is to be noted that the partition line 23 is not on the common plane described in connection with FIG. 1 but is oriented in the manner which will become clear as the description proceeds. In the manner which will presently be illustrated, the optical detector or photodetector 24 is segmented by first and second segmentation lines 251 and 252 into first through third segments 26, 27, and 28. Although designated by like reference numerals, the first and the second segmentation lines 251 and 252 are substantially parallel and are directed as will shortly be described. Like in FIG. 1, the first and the second diffracted beams are incident from the first and the second regions 221 and 222 of the grating element 22 on the beam receiving surface of the optical detector 24 at first and second points of convergence or optical spots 31 and 32 which are on the first and the second segmentation lines 251 and 252. It is to be noted, when strictly spoken, that the first and the second optical spots 31 and 32 are on the first and the second segmentation lines 251 and 252 when focussing is correct and furthermore when the optical beam of the optical source 16 has an actual wavelength which is different from the nominal wavelength within a tolerance determined by a temperature range. The optical detector 24 is depicted as seen backwardly of the beam receiving surface.

In order to describe the partition line 23 of the optical grating element 22 and the first and the second segmentation lines 251 and 252 of the optical detector 24, an orthogonal XYZ coordinate system is defined to have its origin O at the point of intersection of the optical axis with the partition line 23, an XY plane on the grating element 22, and a Z axis which passes through the origin O. Inasmuch as the coordinate system is an orthogonal one, the Z axis is perpendicular to the grating element 22. X and Y axes are optional on the XY plane. Natunally, the coordinate system has YZ and ZX planes. As usual, the coordinate system is a right-handed one.

It will be assumed that the source point 17 has a distance G from the origin O and coordinates $(x(g), y(g), z(g))$. The first and the second points of convergence 31 and 32 have distances $F(1)$ and $F(2)$ from the origin O and coordinates $(x(f1), y(f1), z(f1))$ and $(x(f2), y(f2), z(f2))$. A middle point 33 of a line segment between the first and the second points of convergence 31 and 32 has a distance F from the origin O and coordinates $(x(f), y(f), z(f))$. A plane is defined by the origin O and the source and the middle points 17 and 33 and is herein called a reference plane 35.

Figure 6:
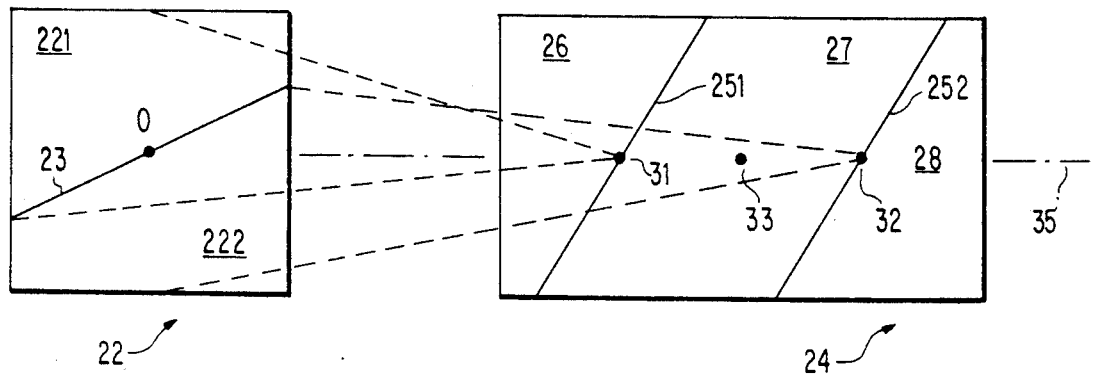
FIG. 6 is a schematic exploded view of an optical grating element and an optical detector which are used in the optical head device shown in FIG. 5.

Referring to FIG. 6 in addition to FIG. 5, the optical grating element 22 and the optical detector 24 are depicted in the manner described in relation to FIG. 2. In the example being illustrated, the first and the second points of convergence 31 and 32 are on the reference plane 35. It will be assumed that the beam receiving surface of the optical detector 24 is perpendicular to the distance F. First and second angles $\phi(1)$ and $\phi(2)$ are formed between the reference plane 35 and the first and the second segmentation lines 251 and 252.

In FIG. 5, the distances G, $F(1)$, and $F(2)$ are preferably equal to one another. This is in order to give the optical grating element 22 a least possible focal power and thereby to prevent a longitudinal aberation from appearing as a result of a variation in the wavelength of the optical beam. In a typical example of the optical head devices which were actually manufactured according to various embodiments of this invention, each of the distances G, $F(1)$, and $F(2)$ was 14.56 mm. A distance between the first and the second points of convergence 31 and 32 was 260 microns. The nominal wavelength $\lambda(0)$ was 0.780 micron. The wavelength varied from a shortest wavelength of 0.775 micron to a longest wavelength of 0.790 micron when a variation in the temperature was about 60° C. Detection of the focussing error is insured in such a temperature range, which may be called an operation insured temperature range. Incidentally, the optical beam is incident from the source point 17 onto the grating element 22 at the origin O preferably with an incident angle of 45°. In this event, the grating element 22 forms an angle of 45° with the reference plane 35.

Figure 7:
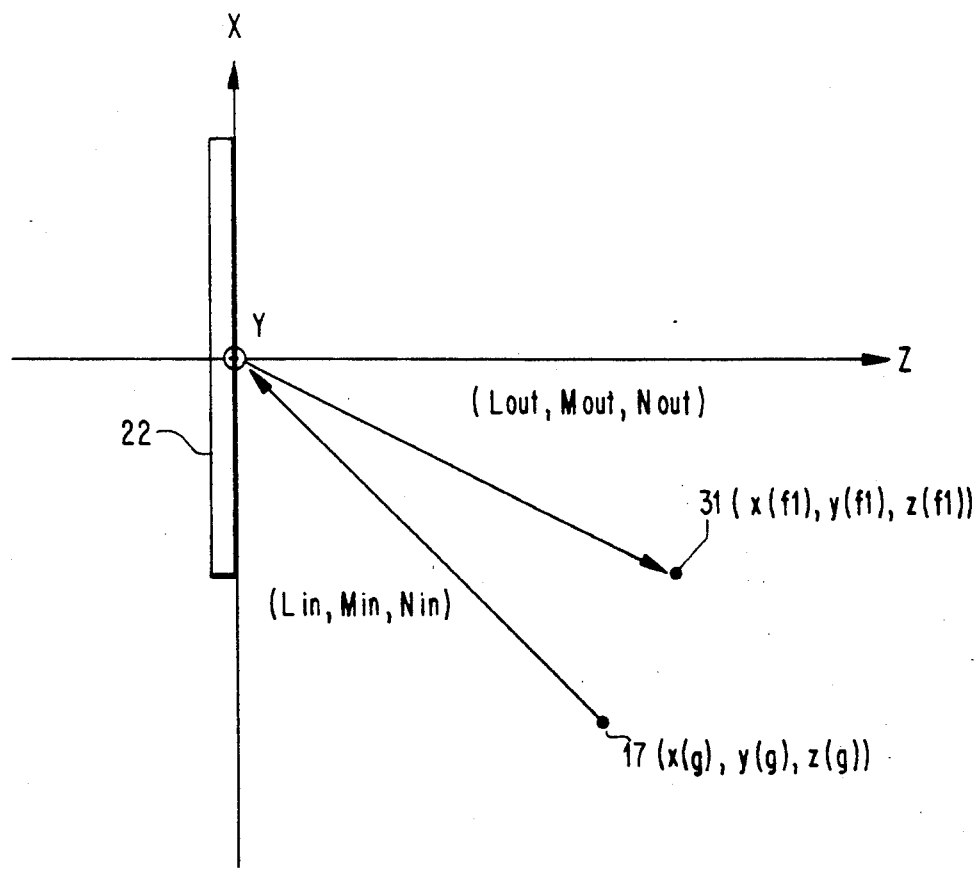
FIG. 7 schematically shows a side view of the optical grating element depicted in FIG. 6 together with a source point and a point of convergence in the optical head device illustrated in FIG. 5.

Turning to FIG. 7, the Y axis is symbolically depicted by an encircled dot which indicates that the Y axis has a positive sense of direction directed from the plane of the figure, namely, from the ZX plane, towards an observer of the figure. The source point 17 and the first point of convergence 31 are distant from the ZX plane in the positive sense of the Y axis. The coordinates of the middle point 33 will be used during a short while instead of the coordinates of the first point of convergence 31 in order merely to simplify mathematical expressions. Similarly, the distance F of the middle point 33 will be used instead of the distance F(1) of the first point of convergence 31.

In FIGS. 5 and 7, it will be presumed that the optical axis has optical axis direction cosines (Lin, Min, Nin). In other words, the optical beam is incident from the source point 17 onto the origin O in a direction represented by the optical axis direction cosines, which are given by:

$$Lin = x(g)/G,$$

$$Min = y(g)/G,$$

and $$Nin = z(g)/G.$$

With reference to FIGS. 5 through 7, each of the first and the second angles $\phi(1)$ and $\phi(2)$ of the first and the second segmentation lines 251 and 252 will be calculated at first. On the first and the second regions 221 and 222 of the optical grating element 22, relief profiles are formed along interference fringes between spherical wave fronts of two coherent beams having source points at the first and the second points of convergence 31 and 32. In this event, each of the first and the second regions 221 and 222 has a phase transfer function $\phi(x, y)$ given by:

$$\phi(x, y) = [2\pi/\lambda(0)][[(x(f)-x)^2 + (y(f)-y)^2 + z^2(f)]^{\frac{1}{2}} - [(x(g)-x)^2 + (y(g)-y)^2 + z^2(g)]^{\frac{1}{2}}].$$

It will now be surmised that the optical beam has an actual wavelength $\lambda$ which may or may not be different from the nominal wavelength $\lambda(0)$. Let the optical grating element 22 produce each of the first and the second diffracted beams from the origin O along a beam axis which has a direction defined by beam axis direction cosines (Lout, Mout, Nout). According to an article contributed by H. W. Holloway et al to the Applied Physics, Volume 20, No. 12 (Jun. 15, 1981), pages 2081 to 2084, under the title of "Computer Analysis of Holographic Systems by Means of Vector Ray Tracing", the beam axis direction cosines are given by:

$$Lout = Lin + [\lambda/(2\pi)]\partial\phi(x, y)/\partial x,$$

$$Mout = Min + [\lambda/(2\pi)]\partial\phi(x, y)/\partial y,$$

and $$Nout = [1 - L^2out - M^2out]^{\frac{1}{2}}.$$

The beam axis is therefore represented by:

$$x/Lout = y/Mout = z/Nout. \quad (1)$$

Inasmuch as the distance between the first and the second points of convergence 31 and 32 is very small as compared with the distance F(1), it is possible to understand that the beam receiving surface of the optical detector 24 is perpendicular to the distance F(1). The beam receiving surface is therefore represented by:

$$x(f)[x - x(f)] + y(f)[y - y(f)] + z(f)[z - z(f)] = 0. \quad (2)$$

Let each of the diffracted beams reach the optical detector 24 or the beam receiving surface at a different point having coordinates (x(pd), y(pd), z(pd)) when the actual wavelength is different from the nominal wavelength. From Equations (1) and (2):

$$x(pd) = F^2 Lout/A, \quad (3)$$

$$y(pd) = F^2 Mout/A, \quad (4)$$

and $$z(pd) = F^2 Nout/A, \quad (5)$$

where:

$$A = x(f)Lout + y(f)Mout + z(f)Nout,$$

which is a function of the actual wavelength because the beam axis direction cosines vary with the wavelength.

In the manner described briefly in relation to the conventional optical head device, each of the first and the second optical spots 31 and 32 is subjected to a displacement along the beam receiving surface when the wavelength of the optical beam varies. Using a relation:

$$A_{\lambda=\lambda(0)} = F,$$

and differentiating Equations (3) through (5) by the wavelength $\lambda$ and putting the actual wavelength $\lambda$ equal to the nominal wavelength $\lambda(0)$:

$$dx(pd)/d\lambda|_{\lambda=\lambda(0)} = [x(f) - Fx(g)/G]/\lambda(0),$$

$$dy(pd)/d\lambda|_{\lambda=\lambda(0)} = [y(f) - Fy(g)/G]/\lambda(0),$$

and $$dz(pd)/d\lambda|_{\lambda=\lambda(0)} = [x(f)(Fx(g)/G - x(f)) + y(f)(Fy(g)/G - y(f))]/[z(f)\lambda(0)],$$

because:

$$dA/d\lambda|_{\lambda=\lambda(0)} = 0.$$

The displacement therefore has a direction defined by displacement direction cosines (B(L), B(M), B(N)) given by:

$$B(L) = [x(f) - Fx(g)/G]/[\lambda(0)BB],$$

$$B(M) = [y(f) - Fy(g)/G]/[\lambda(0)BB],$$

and $$B(N) = [x(f)(Fx(g)/G - x(f)) + y(f)(Fy(g)/G - y(f))]/[z(f)\lambda(0)BB],$$

where:

$$BB = [(x(f) - Fx(g)/G)^2 + (y(f) - Fy(g)/G)^2 + ([x(f)(Fx(g)/G - x(f)) + y(f)(Fy(g)/G - y(f))]/z(f))^2]^{\frac{1}{2}}/\lambda(0).$$

By using the coordinates of the middle point 33, the reference plane 35 is represented by:

$$[y(f)z(g)-y(g)z(f)]x+[x(f)z(g)-x(g)z(f)]y$$
$$+[x(f)y(g)-x(g)y(f)]z=0.$$

The beam receiving surface of the optical detector 24 intersects the reference plane 35 at a line of intersection, which has intersection direction cosines proportional to $(\alpha, \beta, \gamma)$ given by:

$$\alpha = x(f)z(f)z(g)-x(g)z^2(f)-x(g)y^2(f),$$

$$\beta = y(f)z(f)z(g)-y(g)z^2(f)-x^2(f)y(g),$$

and $$\gamma = [x^2(f)(y(f)y(g)-z(f)z(g))$$
$$+y^2(f)(x(f)x(g)-z(f)z(g))$$
$$+z^2(f)(x(f)x(g)-y(f)y(g))]/z(f).$$

From the displacement direction angles and the line of intersection of the optical detector 24 with the reference plane 35, each of the first and the second angles $\phi(1)$ and $\phi(2)$, denoted by $\phi$, is given by:

$$\phi = \arccos[(\alpha B(L)+\beta B(M)+\gamma B(N))$$
$$/(\alpha^2+\beta^2+\gamma^2)^{\frac{1}{2}}]. \quad (6)$$

where the coordinates of the middle point 33 should be changed back to the coordinates of each of the first and the second points of convergence 31 and 32. It is now understood that the first and the second optical spots 31 and 32 move along the first and the second segmentation lines 251 and 252 when the variation takes place in the wavelength of the optical beam. It is therefore possible to get rid of the adverse effects which would otherwise be caused on the focussing error signal.

The first and the second angles $\phi(1)$ and $\phi(2)$ are not much different from each other. As a result, a common angle $\phi$ can be used instead of the individual angles $\phi(1)$ and $\phi(2)$. It is therefore possible to use in Equation (6) the coordinates and the distance of the middle point 33 as they stand. In the typical example exemplified above, the angle $\phi$ is approximately between 10° and 15°.

The description will now proceed to an angle which the partition line 23 of the optical grating element 22 forms either with the reference plane 35 or with a line of intersection of the grating element 22 with the reference plane 35. Instead of the angle, a particular point will be selected on the grating element 22 to have coordinates (x(h), y(h), 0) in the orthogonal XYZ coordinate system so that the partition line 23 may pass through the origin O and the particular point.

If the optical recording medium 18 is correctly or desiredly positioned relative to the optical head device, the optical beam is correctly focussed on the recording medium 18. In this event, the reflected beam converges at the source point 17 when subjected to regular reflection by the optical grating element 22. If the optical beam is defocussed on the recording medium 18, the reflected beam converges at a shifted point of convergence. It will be assumed that the shifted point of convergence has a shift or distance m from the source point 17 and coordinates (x'(g), y'(g), z'(g)).

An arbitrary point will be taken into consideration on the optical grating element 22 to have coordinates (x'(h), y'(h), 0). When generated from the shifted point of convergence, an imaginational beam reaches the arbitrary point along an imaginational beam axis having direction angles (L, M, N) given by:

$$L = (G+m)x(g)-Gx'(h),$$

$$M = (G+m)y(g)-Gy'(h),$$

and $$N = (G+m)z(g).$$

The imaginational beam axis therefore has a direction defined by input direction cosines (L'in, M'in, N'in) or (L/B', M/B', N/B') given by:

$$L'\text{in} = [(G+m)x(g)-Gx'(h)]/B',$$

$$M'\text{in} = [(G+m)y(g)-Gy'(h)]/B',$$

and $$N'\text{in} = (G+m)z(g)/B',$$

where:

$$B' = (L^2+M^2+N^2)^{\frac{1}{2}}.$$

The optical grating element 22 produces an imaginational diffracted beam along a direction defined by output direction cosins (L'out, M'out, N'out), which are given as above by:

$$L'\text{out} = L'\text{in}+[\lambda/(2\pi)]\partial\phi(x,y)/\partial x,$$

$$M'\text{out} = M'\text{in}+[\lambda/(2\pi)]\partial\phi(x,y)/\partial y,$$

and $$N'\text{out} = [1-L'^2\text{out}-M'^2\text{out}]^{\frac{1}{2}}.$$

The imaginational diffracted beam reaches the optical detector 24 at a detector point of convergence having coordinates (x(p), y(p), z(p)) given by:

$$x(p) = t(p)L'\text{out}+x'(h),$$

$$y(p) = t(p)M'\text{out}+y'(h),$$

and $$z(p) = t(p)N'\text{out},$$

where:

$$t(p) = [x'(h)(z(f)y(g)-y(f)z(g))$$
$$+y'(h)(x(f)z(g)-x(g)z(f))]$$
$$/[(y(f)z(g)-z(f)y(g))L'\text{out}$$
$$+(x(g)z(f)-x(f)z(g))M'\text{out}$$
$$+(x(f)y(g)-x(g)y(f))N'\text{out}].$$

It is now understood that the coordinates of the point of convergence 31 or 32 and the coordinates of the detector point substantially satisfy a relation:

$$x(p)-x(f):y(p)-y(f):z(p)-z(f) = \alpha:\beta:\gamma, \quad (7)$$

when the coordinates of the particular point and those of the detector point are related to one another according to a set of ten equations:

$$L\text{in} = [(G+m)x(g)-Gx(h)]/B,$$

$$M\text{in} = [(G+m)y(g)-Gy(h)]/B,$$

$$B = [G^2(G+m)^2$$
$$-2G(G+m)(x(g)x(h)+y(g)y(h))$$

$$+ G^2(x^2(h) + y^2(h))]^{\frac{1}{2}}.$$

$$Lout = Lin - [(x(g) - x(h))/D(g) - (x(f) - x(h))/D(f)].$$

$$Mout = Min - [(y(g) - y(h))/D(g) - (y(f) - y(h))/D(f)].$$

$$Nout = [1 - L^2out - M^2out]^{\frac{1}{2}}.$$

$$t(p) = [x(h)(z(f)y(g) - y(f)z(g)) + y(h)(x(f)z(g) - x(g)z(f))] / [(y(f)z(g) - z(f)y(g))Lout + (x(g)z(f) - x(f)z(g))Mout + (x(f)y(g) - x(g)y(f))Nout].$$

$$x(p) = t(p)Lout + x(h),$$

$$y(p) = t(p)Mout + y(h),$$

and $$z(p) = t(p)Nout.$$

In connection with the ten equations described above, the fact should be noted that the coordinates of the particular point are a function of the shift m. The relation (7) is therefore satisfied for a particular value of the shift m. The partition line 23 of the optical grating element 22 is now determined in consideration of a dynamic range in which the focussing error should be detected. When the dynamic range is between plus and minus d, the particular value of the shift m is given by:

$$m = 2M^2d,$$

where M represents a magnification of the lens system 21.

In connection with the above, it should be understood that the particular point of the optical grating element 22 is determined by using the coordinates of the first and the second points of convergence 31 and 32 as the coordinates of the detector point in Equation (7) and the ten equations which are described following Equation (7). Two partition lines are thereby determined on the grating element 22. The first and the second points of convergence 31 and 32 are, however, close to each other as compared with a distance between the origin of the orthogonal XYZ coordinate system and each of the first and the second points of convergence 31 and 32. The two partition lines are therefore not much different from each other. Consequently, it is possible to use in Equation (7) and the ten equations the coordinates of whichever of the first and the second points of convergence 31 and 32.

Examples of the magnification M and the dynamic range d are 5.5 and between plus and minus 7 microns, respectively. Under the circumstances, the particular value of the shift m is 423.5 microns. An angle of approximately between 10° and 15° is formed between the partition line 23 of the optical grating element 22 and the reference plane 35.

Figure 8A:
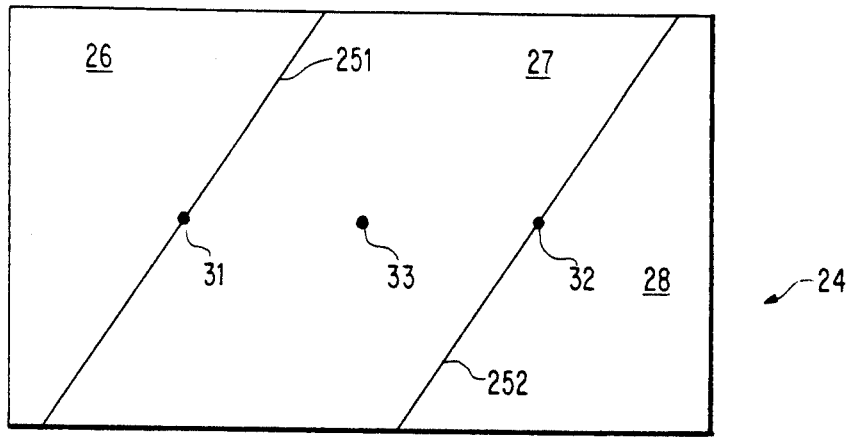
FIGS. 8 A through C are front views of the optical detector depicted in FIG. 7.
Figure 8B:
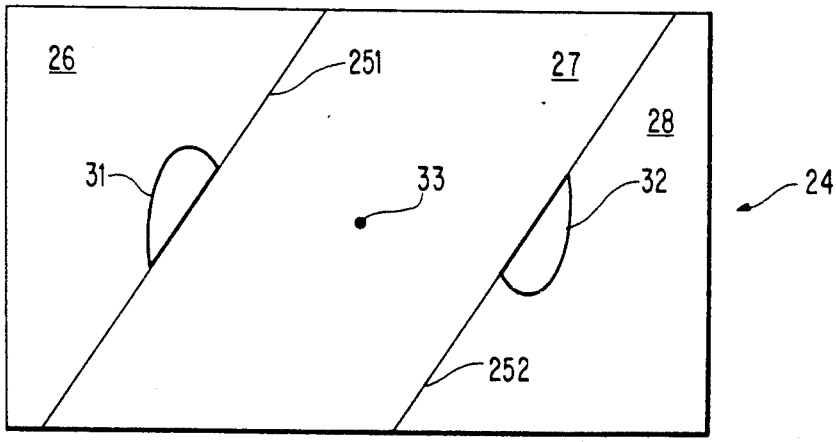
Figure 8C:
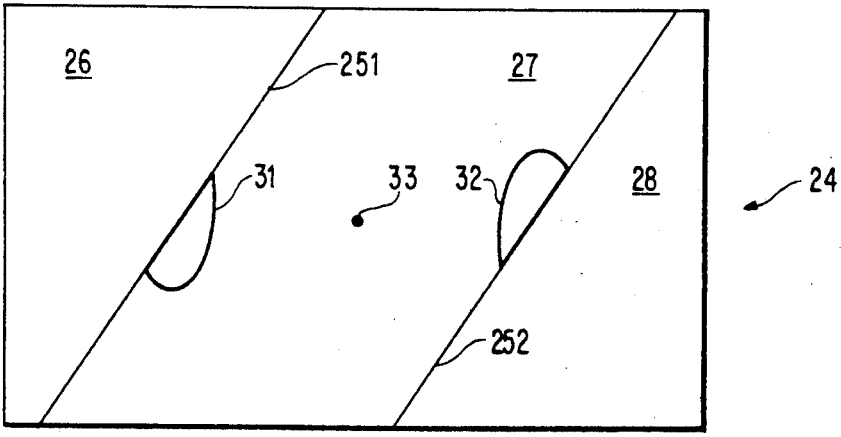

Referring to FIGS. 8 A through C, the first and the second optical spots 31 and 32 move excellently along the first and the second segmentation lines 251 and 252 when the optical beam is substantially focussed by the lens system 21 on the optical recording medium 18. FIG. 8A shows a state when the optical beam is accurately focussed on the recording medium 18. When the recording medium 18 is near to the lens system 21, the first and the second optical spots 31 and 32 are displaced and deformed in the manner exemplified in FIG. 8B. When the recording medium 18 is far from the lens system 21, the first and the second optical spots 31 and 32 are displaced and deformed as exemplified in FIG. 8C. At any rate, the focussing error signal is correctly given by a three-term algebraic sum of V(1) plus V(2) minus V(3), where V(1) through V(3) represent first through third signal components produced by the first through the third segments 26 to 28.

Referring now to FIG. 9, the description will proceed to an optical head device according to a second embodiment of this invention. Similar parts are again designated by like reference numerals. Like the conventional optical head device illustrated with reference to FIGS. 1 and 2, the optical detector or photodetector 24 is segmented by the first and the second orthogonal segmentation lines 251 and 252 into the first through the fourth segments 26 to 29. In the manner described in conjunction with FIGS. 5 through 7, the orthogonal XYZ coordinate system is used in describing the optical head device being illustrated. The first and the second points of convergence or optical spots 31 and 32 have distances F(1) and F(2) from the origin O. The optical beam is incident from the source point 17 onto the optical grating element 22 at the origin O preferably with an incident angle of 45°. The distances G, F(1), and F(2) are preferably equal to one another. The optical detector 24 is perpendicular to the distance F of the middle point 33.

Figure 10:
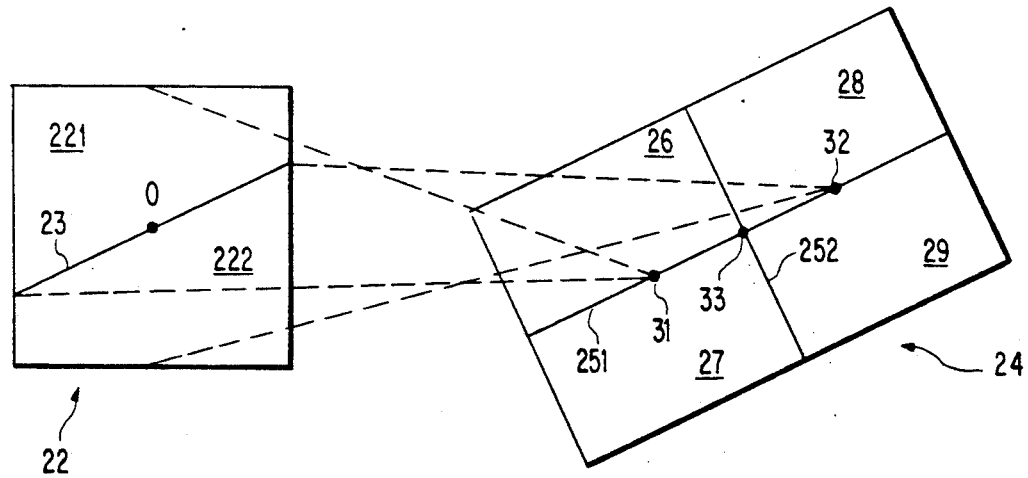
FIG. 10 is a schematic exploded view of an optical grating element and an optical detector which are used in the optical head device shown in FIG. 9.

Turning to FIG. 10, the optical grating element 22 and the optical detector 24 are illustrated as in FIGS. 2 and 6. The first and the second points of convergence 31 and 32 are not on the reference plane 35 but are on both sides. In any event, the first and the second points of convergence 31 and 32 are on the first segmentation line 251 which forms with the reference plane 35 an angle $\phi$ given by Equation (6).

Strictly speaking, the first and the second points of convergence 31 and 32 move in first and second directions forming the first and the second angles $\phi(1)$ and $\phi(2)$ with the reference plane 35 in the manner which is described in connection with FIG. 6 and is discussed in relation to Equation (6). The first and the second angles are, however, not much different. It is therefore possible to exempt the focussing error signal from the adverse effects which would otherwise be caused by the defocussing and by the variation caused in the wavelength of the optical beam by the variation in the temperature.

Figure 11A:
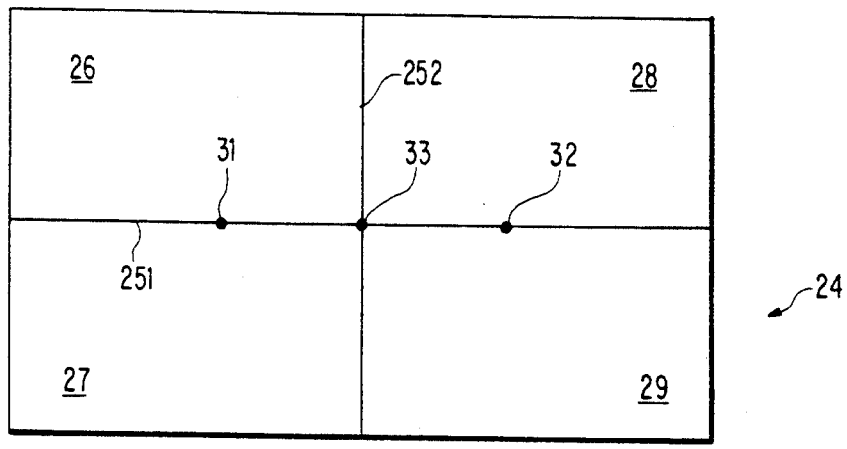
FIGS. 11 A through C are front views of the optical detector depicted in FIG. 10.
Figure 11B:
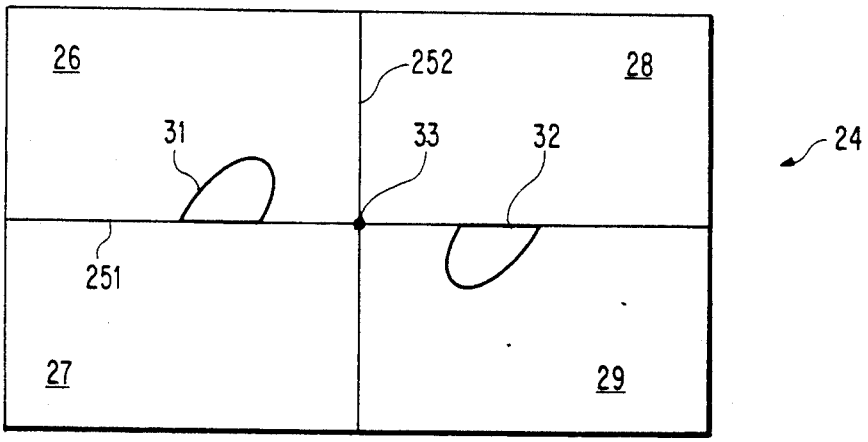
Figure 11C:
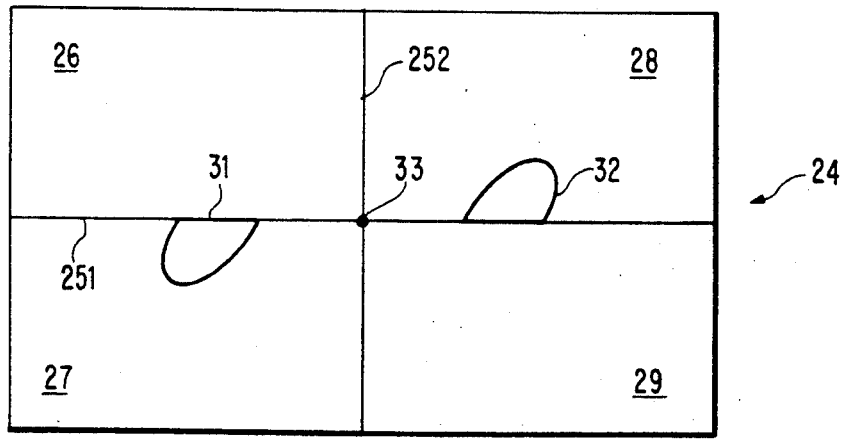

Further turning to FIGS. 11 A through C, the first and the second optical spots 31 and 32 are subjected to displacements and deformations when the optical recording medium 18 is not correctly positioned relative to the optical head device. FIG. 11A shows a case where the optical beam is correctly focussed on the recording medium 18. When the recording medium 18 is near to the lens system 21, the first and the second optical spots 31 and 32 are displaced and deformed in the manner exemplified in FIG. 11B. When the recording medium 18 is far from the lens system 21, the first and the second optical spots 31 and 32 are displaced and deformed as exemplified in FIG. 11C.

Figure 12:
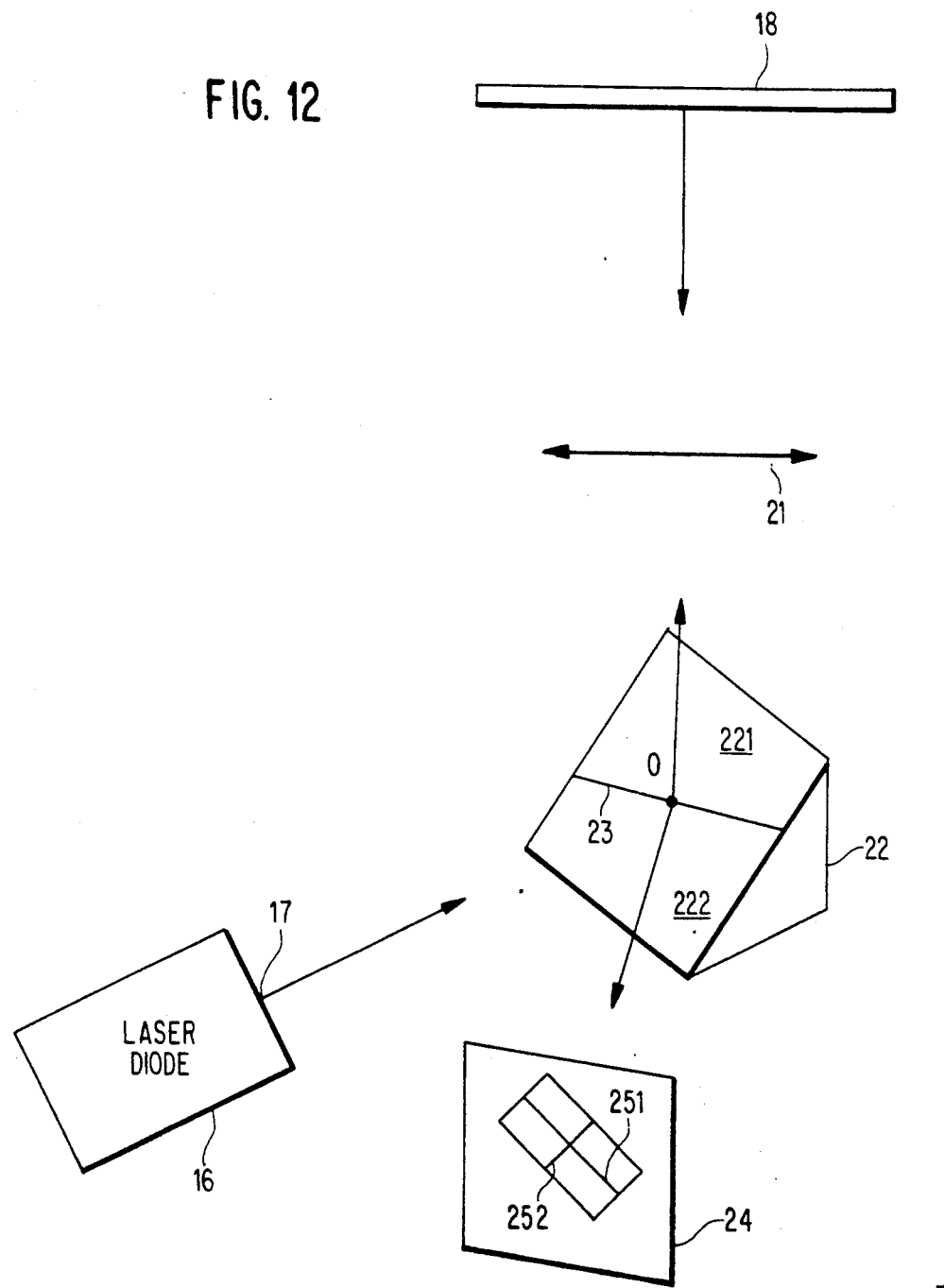
FIG. 12 is a schematic perspective view of an optical head device according to a third embodiment of this invention, an optical source, and an optical recording medium.

Referring now to FIG. 12, the description will proceed to an optical head device according to a third embodiment of this invention. In FIG. 13, the optical head device is similar to that illustrated with reference to FIG. 9 and comprises similar parts which are once again designated by like reference numerals. The optical detector or photodetector 24 is similar to that described in conjunction with FIGS. 9 and 10. The orthogonal XYZ coordinate system is again taken into consideration. The optical beam is incident from the source point 17 onto the optical grating element 22 at the origin O preferably with an incident angle of 45°. The distances G, F(1), and F(2) are preferably equal to one another. It will again be presumed that the optical detector 24 is perpendicular to the distance F of the middle point 33.

Turning to FIGS. 13 A through C, attention will be directed to displacements of the first and the second optical spots 31 and 32 on a four-segmented optical detector used in an optical head device in general. Inasmuch as FIGS. 13 A through C are for use in describing the principles of design of the optical head device illustrated in FIG. 12, the four-segmented optical detector is designated by the reference numeral 24.

Figure 13A:
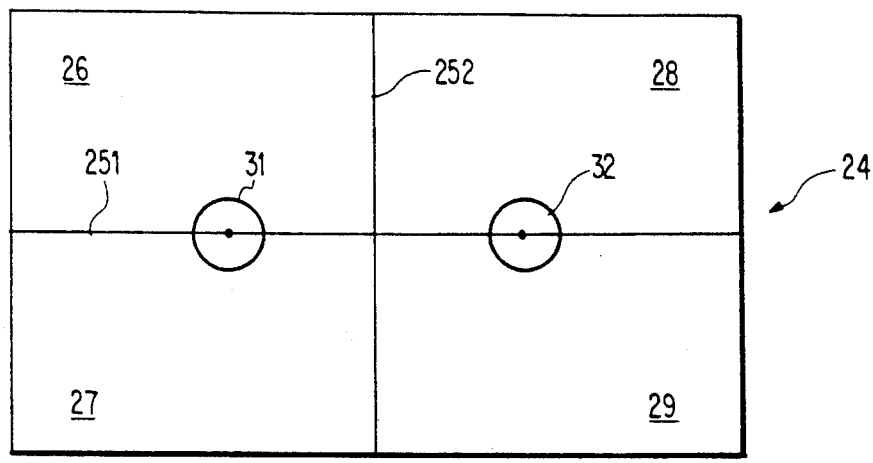
FIGS. 13 A through C are front views of an optical detector used in an optical head device in general and are for use in describing the principles of design of the optical head device shown in FIG. 12.
Figure 13B:
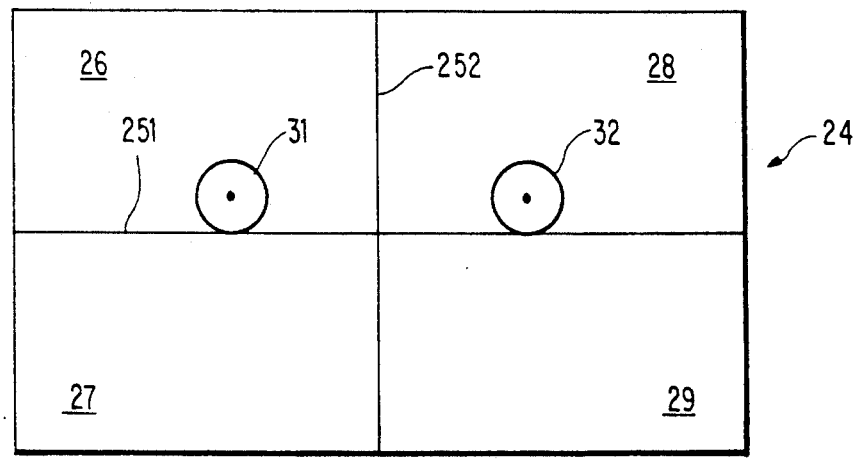
Figure 13C:
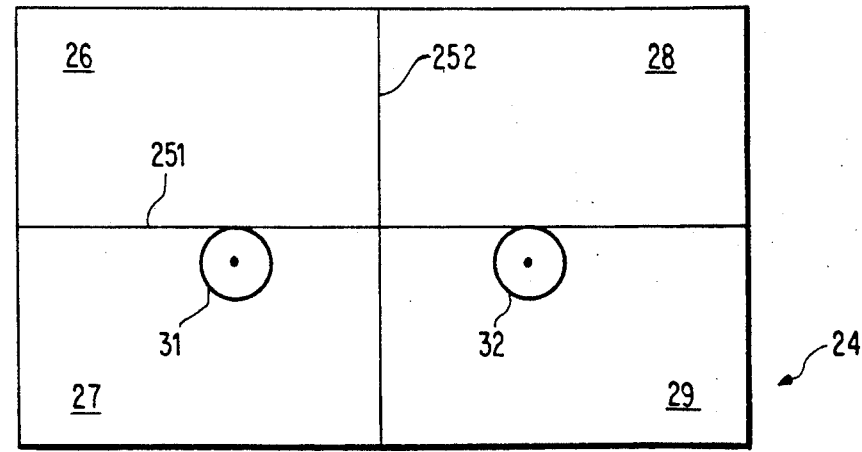

FIG. 13A shows the first and the second optical spots 31 and 32 for a case where the optical detector 24 is correctly positioned relative to the first and the second diffracted beams produced by the optical grating element 22. In the manner exemplified in FIG. 13B, the optical spots 31 and 32 may be displaced towards the top of the figure. As exemplified in FIG. 13C, the optical spots 31 and 32 may alternatively be displaced towards the bottom of the figure. In either event, the read-out and the focussing error signals are adversely affected.

It may be mentioned here that the optical detector 24 is more than 500 microns long and about 300 microns wide. The first segmentation line 251 has a predetermined width of about 10 microns between the odd-numbered segments 26 and 28 and the even-numbered segments 27 and 29. Each of the first and the second optical spots 31 and 32 may have a diameter of about 10 microns.

Experiments were carried out to study the adverse effects caused on the read-out signal by components which the displacements of the first and the second optical spots 31 and 32 have orthogonally of the first segmentation line 251. When each of the components reached 28 microns, the read-out signal had a reduced intensity which was 80 percent of a maximum value obtained when the optical spots 31 and 32 were correctly on the first segmentation line 251. The reduced intensity was tolerable in practice. These experiments show that the first segmentation line 251 should be positioned so that the components are not greater than 2.8 times the predetermined width and are both on one side of the first segmentation line 251.

When the actual wavelength is different from the nominal wavelength, the first and the second diffracted beams are directed accordingly to reach the optical detector 24 at first and second different points of convergence which have coordinates (x(pi, λ), y(pi, λ), z(pi, λ)) in the orthogonal XYZ coordinate system, where i=1 and 2. It is therefore possible to calculate first and second distances Y(i, λ) which the first and the second different points of convergence have from a center line of the first segmentation line 251.

By using Equation (2) in representing the beam receiving surface of the optical detector 24 and Equations (3) through (5) in representing the coordinates of the first and the second different points of convergence, the first and the second distances are given by:

$$Y(i, \lambda) = [(y(f)z(g) - z(f)y(g))x(pi, \lambda)$$
$$+ (x(g)z(f) - x(f)z(g))y(pi, \lambda)$$
$$+ (x(f)y(g) - x(g)y(f))z(pi, \lambda)$$
$$/[(y(f)z(g) - z(f)y(g))^2$$
$$+ (x(f)z(g) - x(g)z(f))^2$$
$$+ (x(f)y(g) - x(g)y(f))^2]^{\frac{1}{2}}.$$

The first and the second distances should have one of plus and minus signs in common.

Figure 14:
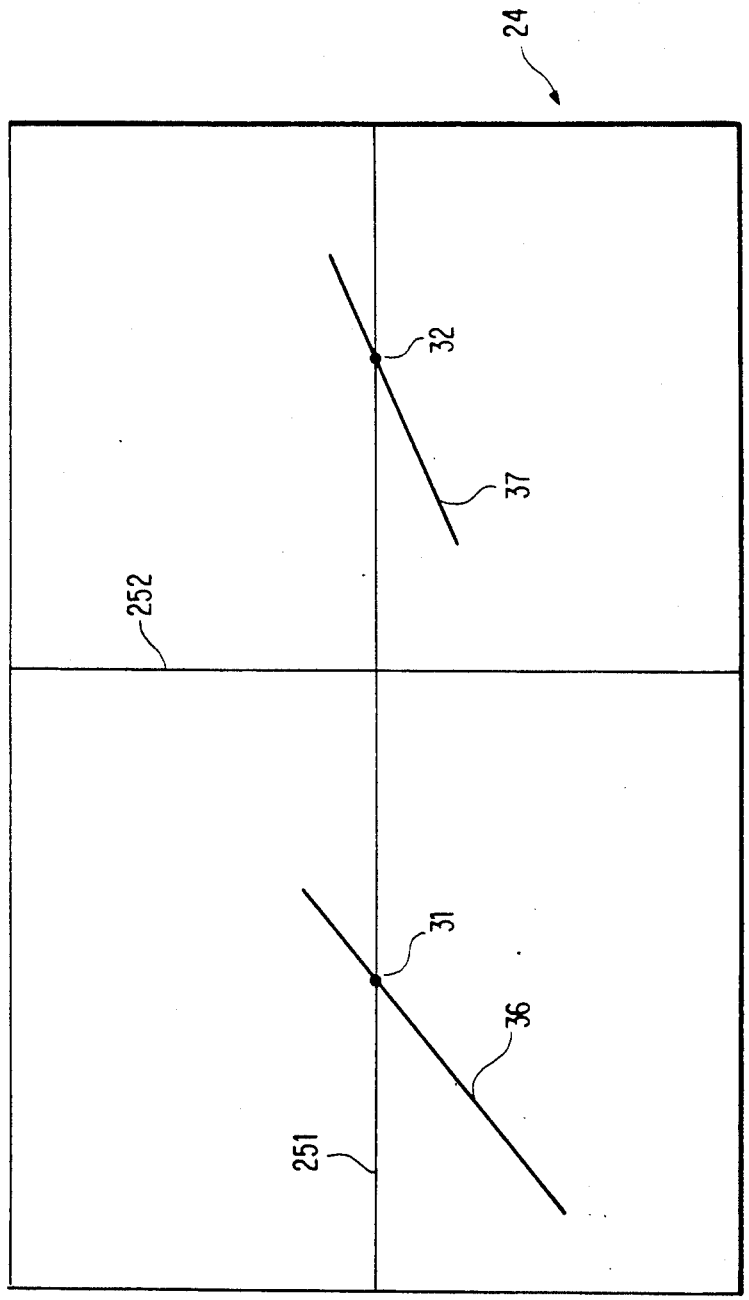
FIG. 14 is a much enlarged front view of an optical detector which is used in the optical head device illustrated in FIG. 12.

Referring to FIG. 14, the first and the second points of convergence 31 and 32 move along first and second loci 36 and 37 which were calculated for different wavelengths of the optical beam with the focussing error kept at zero. On calculating the loci 36 and 37, the afore-described typical example was used. Furthermore, the following numerical examples were used. The first and the second points of convergence 31 and 32 were 260 microns spaced apart along the first segmentation line 251. The optical axis formed an angle of 22.48° with the beam axis of the first and the second diffracted beams reaching the middle point 33 when the optical beam had the nominal wavelength. The first segmentation line 251 formed an angle of 10° with the reference plane 35.

As a result of calculation, the first distance Y(1, λ) reached a maximum of about 6.7 microns when the actual wavelength was 0.790 micron. In this event, the second distance Y(2, λ) had a maximum of about 2.7 microns. It is therefore confirmed that the optical head device is excellently operable. Incidentally, the first and the second optical spots 31 and 32 are subjected to displacements and deformations in the manner described in connection with FIGS. 11 A through C.

Reviewing FIGS. 5 through 14, it is possible to manufacture the optical grating element 22 in a large quantity in the manner described in the Ono et al United States patent application cited hereinabove. The optical detector or photodetector 24 is manufactured in the known manner.

It should be understood that the X and the Y axes can optionally be determined on the XY plane. It is therefore possible with no loss of generality at all to determine the X and the Y axes so that either the source point 17 of the optical source 16 or the middle point 33 between the first and the second points of convergence 31 and 32 on the optical detector 24 may be on one of the ZX and the YZ planes. For convenience, the ZX plane is determined to include the source point 17.

In this event, Equation (7) should be satisfied when the coordinates x(h), y(h), x(p), y(p), and z(p) are related to one another according to a set of eleven equations:

$$m = 2M^2 d,$$

$$Lin = [(G+m)x(g) - Gx(h)]/B,$$

$$Min = -Gy(h)/B,$$

$$B = [G^2(G+m)^2 - 2G(G+m)x(g)x(h) + G^2(x^2(h) + y^2(h))]^{\frac{1}{2}},$$

$$Lout = Lin - [(x(g) - x(h))/D(g) - (x(f) - x(h))/D(f)],$$

$$Mout = -[-y(h)/D(g) - (y(f) - y(h))/D(f)],$$

$$Nout = [1 - L^2 out - M^2 out]^{\frac{1}{2}},$$

$$t(p) = [-x(h)y(f)z(g) + y(h)x(f)z(g) - x(g)z(f))]$$
$$/[y(f)z(g)Lout - (x(f)z(g) - x(g)z(f))Mout$$
$$- y(g)y(f)Nout].$$

$x(p) = t(p)Lout + x(h)$, $y(p) = t(p)Mout + y(h)$, and $z(p) = t(p)Nout$.

Furthermore, the direction cosines (B(L), B(M), B(N)) should be defined substantially as follows either for the first and the second segmentation lines 251 and 252 in common or for the first segmentation line 251 described in conjunction with FIGS. 9 and 10 and FIG. 12:

$B(L) = [x(f) - Fx(g)/G]/[\lambda(0)BB]$, $B(M) = y(f)/[\lambda(0)BB]$, and $B(N) = [x(f)(Fx(g)/G - x(f)) - y^2(f)] /[z(f)\lambda(0)BB]$.

where:

$BB = [(x(f) - Fx(g)/G)^2 + y^2(f) + (x(f)(Fx(g)/G - x(f)) - y^2(f))/z(f))^2]^{\frac{1}{2}}/\lambda(0)$.

When the first and the second segmentation lines 251 and 252 should form individual angles with the reference plane 35, their direction cosines (B(L1), B(M1), B(N1)) and B(L2), B(M2), B(N2)) should be defined substantially by:

$B(L1) = [x(f1) - F(1)x(g)/G]/[\lambda(0)BB(1)]$, $B(M1) = y(f1)/[\lambda(0)BB(1)]$, $B(N1) = [x(f1)(F(1)x(g)/G - x(f1)) - y^2(f1)] /[z(f1)\lambda(0)BB(1)]$, $B(L2) = [x(f2) - F(2)x(g)/G]/[\lambda(0)BB(2)]$, $B(M2) = y(f2)/[\lambda(0)BB(2)]$, and $B(N2) = [x(f2)(F(2)x(g)/G - x(f2)) - y^2(f2)] /[z(f2)\lambda(0)BB(2)]$.

where:

$BB(1) = [(x(f1) - F(1)x(g)/G)^2 - y^2(f1) + ((x(f1)(F(1)x(g)/G - x(f1)) - y^2(f1))/z(f1))^2]^{\frac{1}{2}}/\lambda(0)$, and $BB(2) = [(x(f2) - F(2)x(g)/G)^2 - y^2(f2) + ((x(f2)(F(2)x(g)/G - x(f2)) - y^2(f2))/z(f2))^2]^{\frac{1}{2}}/\lambda(0)$.

Still further, it is possible to represent the first and the second distances as:

$Y(i, \lambda) = [Ax(pi, \lambda) + By(pi, \lambda) + Cz(pi, \lambda)] /[A^2 + B^2 + C^2]^{\frac{1}{2}}$, where:

$A = y(f)z(g)$, $B = x(g)z(f) - x(f)z(g)$, $C = -x(g)y(f)$, $x(pi, \lambda) = t(pi, \lambda)Lout(i, \lambda)$, $y(pi, \lambda) = t(pi, \lambda)Mout(i, \lambda)$, and $z(pi, \lambda) = t(pi, \lambda)Nout(i, \lambda)$, where, in turn:

$t(pi, \lambda) = F^2/[x(f)Lout(i, \lambda) + y(f)Mout(i, \lambda) + z(f)Nout(i, \lambda)]$, $Lout = x(g)/G - \lambda[x(g)/G - x(fi)/F(i)]/\lambda(0)$, $Mout = -\lambda y(fi)/F(i)\lambda(0)]$, and $Nout = [1 - L^2out(i, \lambda) - M^2out(i, \lambda)]^{\frac{1}{2}}$.

While this invention has thus far been described in specific conjunction with a few preferred embodiments thereof, it will now be readily possible for one skilled in the art to put this invention into practice in various other manners. For example, it is possible to use a transmitting optical grating element instead of the reflecting optical grating element 22. In this event, the optical beam of the optical source 16 should be subjected to zeroth-order diffraction towards the focussing lens system 21 rather than to the regular reflection.

What is claimed is:

1. An optical head device for use in combination with an optical source for generating an optical beam along an optical axis from a source point and comprising a lens system having a magnification M for focussing said optical beam substantially on an optical recording medium which reflects said optical beam to make said lens system produce a reflected beam; a reflection optical grating element, arranged between said optical source and said lens system, comprising first and second regions partitioned by a partition line intersecting said optical axis for diffracting said reflected beam into first and second diffracted beams; and an optical detector comprising first through third segments, segmented by first and second segmentation lines, for receiving said first and second diffracted beams at first and second points of convergence to produce electric output signals from said first through third segments, each of said first and said second points of convergence being on said segmentation line between two of said segments, wherein said partition line passes through an origin O and a particular point (x(h), y(h), 0) of an orthogonal XYZ coordinate system, where;

said orthogonal XYZ coordinate system is defined by said origin of intersection of said optical axis with said partition line, an XY plane along said grating element, and a Z axis passing through said origin; said source point has a distance G from said origin and coordinates (x(g), y(g), z(g); a middle point between said first and second points of convergence has coordinates has (x(f), y(f), z(f); D(g) and D(f) are distances of said particular point from said source and said middle point; the coordinates x(h) and y(h) substantially satisfy a relation:

$$x(p)-x(f):y(p)-y(f):z(p)-z(f)=\alpha:\beta:\gamma$$

where $x(p)$, $y(p)$, and $z(p)$ represent coordinates of a point on said optical detector; $\alpha$, $\beta$ and $\gamma$ are proportional to direction cosines of a line of intersection of said optical detector with a reference plane defined by said origin and said source and said middle point; d corresponds to a margin; m corresponds to a shift; and the coordinates $x(h)$, $y(h)$, $x(p)$, $y(p)$, and $z(p)$ are related to one another according to set of eleven equations:

$$m=2M^2d,$$

$$Lin=[(G+m)x(g)-Gx(h)]/B,$$

$$Min=-Gy(h)/B,$$

$$B=[G^2(G+m)^2-2G(G+m)x(g)x(h)+G^2(x^2(h)+y^2(h))]^{\frac{1}{2}},$$

$$Lout=Lin-[(x(g)-x(h))/D(g)-(x(f)-x(h))/D(f)],$$

$$Mout=Min-[-y(h)/D(g)-(y(f)-y(h))/D(f)],$$

$$Nout=[1-L^2out-M^2out]^{\frac{1}{2}},$$

$$t(p)=[-x(h)y(f)z(g)+y(h)(x(f)z(g)-x(g)z(f))]/[y(f)z(g)Lout+(x(f)z(g)-x(g)z(f))Mout-x(g)y(f)Nout],$$

$$x(p)=t(p)Lout+x(h),$$

$$y(p)=t(p)Mout+y(h),$$

and $$z(p)=t(p)Nout.$$

2. An optical head device as claimed in claim 1, said optical beam having a nominal wavelength $\lambda(0)$, said middle point having a distance F from said origin, wherein said first and said second points of convergence are on said reference plane, said segmentation line having direction cosines (B(L), B(M), B(N)) which are defined substantially by:

$$B(L)=[x(f)-Fx(g)/G]/[\lambda(0)BB],$$

$$B(M)=y(f)/[\lambda(0)BB],$$

and $$B(N)=[x(f)(Fx(g)/G-x(f))-y^2(f)]/[z(f)\lambda(0)BB],$$

where:

$$BB=[(x(f)-Fx(g)/G)^2+y^2(f)+(x(f)(Fx(g)/G-x(f))-y^2(f))/z(f))^2]^{\frac{1}{2}}/\lambda(0).$$

3. An optical head device as claimed in claim 2, said first and said second points of convergence having distances F(1) and F(2) from said origin, wherein the distances G, F(1), and F(2) are equal to one another.

4. An optical head device as claimed in claim 1, said optical beam having a nominal wavelength $\lambda(0)$, said first and said second points of convergence having distances F(1) and F(2) from said origin and coordinates (x(f1), y(f1), z(f1)) and (x(f2), y(f2), z(f2)) and being on first and second segmentation lines for segmenting said optical detector into said first through said third segments, wherein said first and said second points of convergence are on said reference plane, said first and said second segmentation lines having direction cosines (B(L1), B(M1), B(N1)) and (B(L2), B(M2), B(N2)) which are defined substantially by:

$$B(L1)=[x(f1)-F(1)x(g)/G]/[\lambda(0)BB(1)],$$

$$B(M1)=y(f1)/[\lambda(0)BB(1)],$$

$$B(N1)=[x(f1)(F(1)x(g)/G-x(f1))-y^2(f1)]/[z(f1)\lambda(0)BB(1)],$$

$$B(L2)=[x(f2)-F(2)x(g)/G]/[\lambda(0)BB(2)],$$

$$B(M2)=y(f2)/[\lambda(0)BB(2)],$$

and $$B(N2)=[x(f2)(F(2)x(g)/G-x(f2))-y^2(f2)]/[z(f2)\lambda(0)BB(2)],$$

where:

$$BB(1)=[(x(f1)-F(1)x(g)/G)^2+y^2(f1)+((x(f1)(F(1)-x(g)/G-x(f1))-y^2(f1))/z(f1))^2]^{\frac{1}{2}}/\lambda(0),$$

and $$BB(2)=[(x(f2)-F(2)x(g)/G)^2+y^2(f2)+((x(f2)(F(2)-x(g)/G-x(f2))-y^2(f2))/z(f2))^2]^{\frac{1}{2}}/\lambda(0).$$

5. An optical head device as claimed in claim 4, wherein the distances G, F(1), and F(2) are equal to one another.

6. An optical head device for use in combination with an optical source for generating an optical beam along an optical axis from a source point and comprising a lens system having a magnification M for focussing said optical beam substantially on an optical recording medium which reflects said optical beam to make said lens system produce a reflected beam; a reflection optical grating element, arranged between said optical source and said lens system, comprising first and second regions partitioned by a partition line intersecting said optical axis for diffracting said reflected beam into first and second diffracted beams; and an optical detector, comprising first through fourth segments with odd-numbered and even-numbered segments segmented by a first segmentation line and a second segmentation line orthogonally intersecting said first segmentation line, for receiving said first and second diffracted beams at first and second points of convergence to produce electric output signals from said first through fourth segments, said first and second points of convergence being on said first segmentation line, wherein said partition line passes through an origin O and a particular point (x(h), y(h), 0) of an orthogonal XYZ coordinate system, and said first segmentation line has direction cosines (B(L), B(M), B(N)), where:

said orthogonal XYZ coordinate system is defined by said origin of intersection of said optical axis with said partition line, an XY plane along said grating element, and a Z axis passing through said origin; said source point has a distance G from said origin and coordinates (x(g), y(g), z(g)); a middle point between said first and second points of convergence has coordinates (x(f), y(f), z(f)); D(g) and D(f) are distances of said particular point from said source and said middle point; the coordinates x(h) and y(h) substantially satisfy a relation:

$$x(p)-x(f):y(p)-y(f):z(p)-z(f)=\alpha:\beta:\gamma$$

x(p), y(p) and z(p) represent coordinates of a point on said optical detector; $\alpha$, $\beta$ and $\gamma$ are proportional to direction cosines of a line of intersection of said optical detector with a reference plane defined by said origin and said source and said middle point; d corresponds to a margin; m corresponds to a shift; and the coordinates x(h), y(h), x(p), y(p) and z(p) are related to one another according to a set of eleven equations:

$$m=2M^2d,$$

$$Lin=[(G+m)x(g)-Gx(h)]/B,$$

$$Min=-Gy(h)/B,$$

$$B=[G^2(G+m)^2-2G(G+m)x(g)x(h)+G^2(x^2(h)+y^2(h))]^{\frac{1}{2}},$$

$$Lout=Lin-[(x(g)-x(h))/D(g)-(x(f)-x(h))/D(f)],$$

$$Mout=Min-[-y(h)/D(g)-(y(f)-y(h))/D(f)],$$

$$Nout=[1-L^2out-M^2out]^{\frac{1}{2}},$$

$$t(p)=[-x(h)y(f)z(g)+y(h)(x(f)z(g)-x(g)z(f))]/[y(f)z(g)Lout+(x(f)z(g)-x(g)z(f))Mout-x(g)y(f)Nout],$$

$$x(p)=t(p)Lout+x(h),$$

$$y(p)=t(p)Mout+y(h), \text{ and}$$

$$z(p)=t(p)Nout.$$

said direction cosines (B(L), B(M), B(N)) are defined substantially by:

$$B(L)=[x(f)-Fx(g)/G]/[\lambda(0)BB],$$

$$B(M)=y(f)/[\lambda(0)BB],$$

and $$B(N)=[x(f)(Fx(g)/G-x(f))+y^2(f)]/[z(f)\lambda(0)BB],$$

where $$BB=[(x(f)-Fx(g)/G)^2+y^2(f)+((x(f)(Fx(g)/G-x(f))-y^2(f))/z(f))^2]^{\frac{1}{2}}/\lambda(0).$$

7. An optical head device as claimed in claim 6, said first and said second points of convergence having distances F(1) and F(2) from said origin, wherein the distances G, F(1), and F(2) are equal to one another.

8. An optical head device as claimed in claim 1, said optical beam having an actual wavelength $\lambda$ variable on both sides of a nominal wavelength $\lambda(0)$, said optical detector further comprising a fourth segment and being segmented by a first segmentation line into odd-numbered and even-numbered segments and by a second segmentation line orthogonally intersecting said first segmentation line at said middle point, said first segmentation line having a predetermined width between said odd-numbered and said even-numbered segments, said first and said second points of convergence being on said first segmentation line, said middle point having a distance F from said origin and coordinates (x(f), y(f), z(f)), said first and said second points of convergence having distances F(1) and F(2) from said origin and coordinates (x(f1), y(f1), z(f1)) and (x(f2), y(f2), z(f2)), wherein distances Y(1, $\lambda$) and Y(2, $\lambda$) have one of plus and minus signs in common, each of said distances Y(1, $\lambda$) and Y(2, $\lambda$) being not greater than 2.8 times said predetermined width, where:

$$Y(i, \lambda)=[Ax(pi, \lambda)+By(pi, \lambda)+Cz(pi, \lambda)]/[A^2+B^2+C^2]^{\frac{1}{2}},$$

for i=1 and 2, where:

$$A=y(f)z(g),$$

$$B=x(g)z(f)-x(f)z(g),$$

$$C=-x(g)y(f),$$

$$x(pi, \lambda)=t(pi, \lambda)Lout(i, \lambda),$$

$$y(pi, \lambda)=t(pi, \lambda)Mout(i, \lambda),$$

and $$z(pi, \lambda)=t(pi, \lambda)Nout(i, \lambda),$$

where:

$$t(pi, \lambda)=F^2/[x(f)Lout(i, \lambda)+y(f)Mout(i, \lambda)+z(f)Nout(i, \lambda)],$$

$$Lout(i, \lambda)=x(g)/G-\lambda[x(g)/G-x(fi)/F(i)]/\lambda(0),$$

$$Mout(i, \lambda)=-\lambda y(fi)/[F(i)\lambda(0)],$$

and $$Nout(i, \lambda)=[1-L^2out(i, \lambda)-M^2out(i, \lambda)]^{\frac{1}{2}}.$$

9. An optical head device as claimed in claim 8, wherein said first segmentation line has direction cosines (B(L), B(M), B(N)) which are defined substantially by:

$$B(L)=[x(f)-Fx(g)/G]/[\lambda(0)BB],$$

$$B(M)=y(f)/[\lambda(0)BB],$$

and $$B(n)=[x(f)(Fx(g)/G-x(f))-y^2(f)]/[\lambda(0)BB],$$

where:

$$BB=[x(f)-Fx(g)/G)^2+y^2(f)+((x(f)(Fx(g)/G-x(f))-y^2(f))/z(f))^2]^{\frac{1}{2}}/\lambda(0).$$

10. An optical head device as claimed in claim 9, wherein the distances G, F(1), and F(2) are equal to one another.

11. An optical head device for use in combination with an optical source for generating an optical beam along an optical axis from a source point and comprising a lens system having a magnification for focussing said optical beam substantially on an optical recording medium which reflects said optical beam to make said lens system produce a reflected beam; a reflection optical grating element, arranged between said optical source and said lens system, comprising first and second regions partitioned by a partition line intersecting said optical axis for diffracting said reflected beam into first and second diffracted beams; and an optical detector comprising first through third segments, segmented by first and second segmentation lines, for receiving said first and second diffracted beams at first and second points of convergence to produce electric output signals from said first through third segments, each of said first and second points of convergence being on said segmentation line between two of said segments, wherein said partition line and said first and second segmentation lines each has a position and a direction such that said first and second points of convergence substantially follow said first and second segmentation lines, respectively, even when a wavelength of said optical beam varies.

12. An optical head device for use in combination with an optical source for generating an optical beam along an optical axis from a source point and comprising a lens system having a magnification for focussing said optical beam substantially on an optical recording medium which reflects said optical beam to make said lens system produce a reflected beam; a reflection optical grating element, arranged between said optical source and said lens system, comprising first and second regions partitioned by a partition line intersecting said optical axis for diffracting said reflected beam into first and second diffracted beams; and an optical detector comprising first through fourth segments, segmented by a first segmentation line and a second segmentation line orthogonally intersecting said first segmentation line, for receiving said first and second diffracted beams at first and second points of convergence to produce electric output signals from said first through fourth segments, said first and second points of convergence being on said first segmentation line, wherein said partition line and said first segmentation line each has a position and direction such that said first and second points of convergence substantially follow said first segmentation line even when a wavelength of said optical beam varies.

* * * * *

UNITED STATES PATENT AND TRADEMARK OFFICE
CERTIFICATE OF CORRECTION

PATENT NO. : 5,151,892

DATED : September 29, 1992

INVENTOR(S) : Yasuo KIMURA

It is certified that error appears in the above-identified patent and that said Letters Patent is hereby corrected as shown below:

Col. 3, line 5, delete "0." and insert --0,--;

Col. 6, line 10, delete "secon" and insert --second--;

Col. 17, line 35, delete "i" and insert --1--.

Signed and Sealed this

Seventh Day of December, 1993

Attest:

BRUCE LEHMAN

Attesting Officer

Commissioner of Patents and Trademarks